Patented Jan. 8, 1935

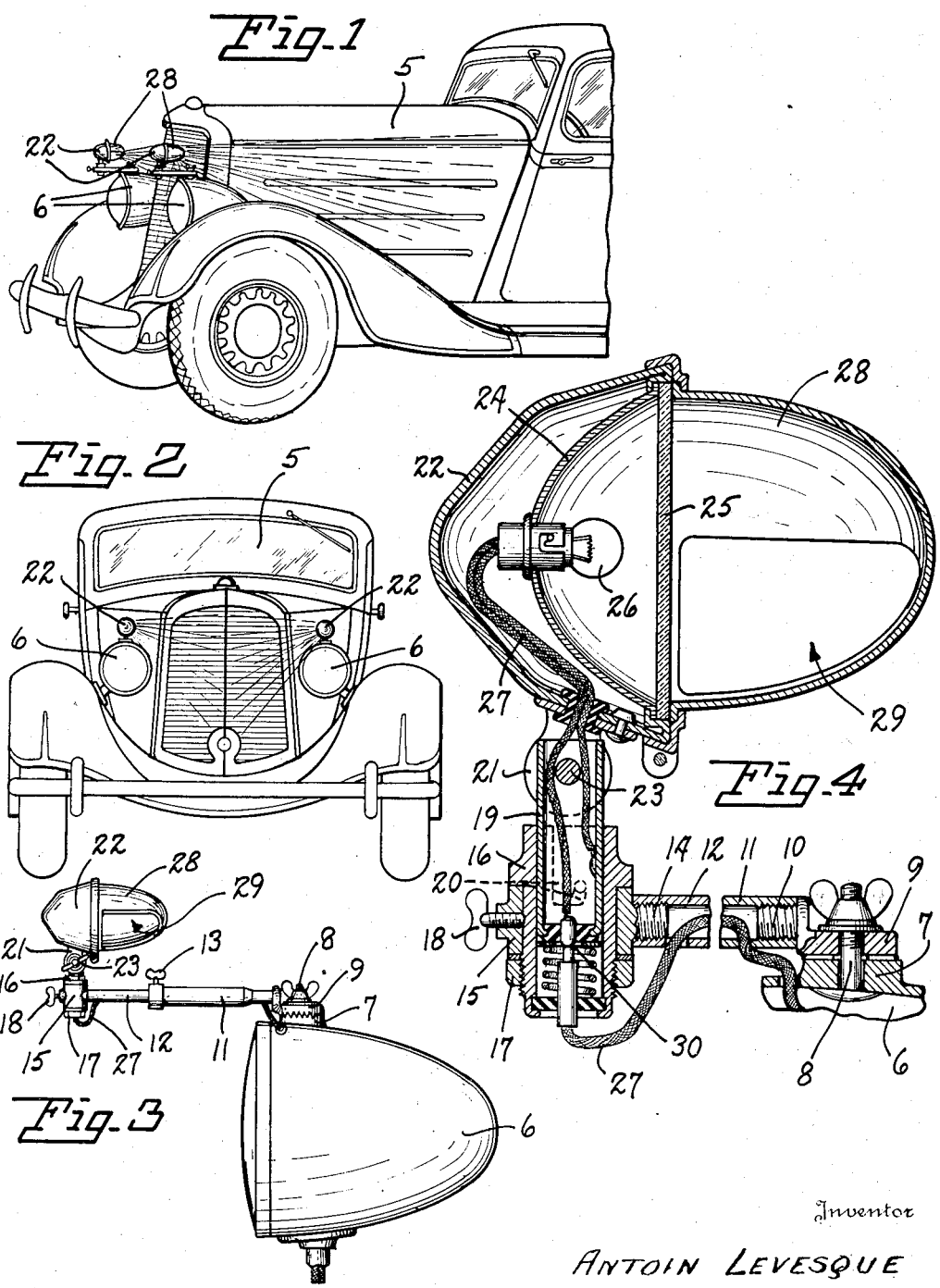

1,987,117

UNITED STATES PATENT OFFICE 1,987,117

AUXILIARY HEADLIGHT

Antoin Levesque, Spokane, Wash.

Application January 29, 1934, Serial No. 708,838

1 Claim. (Cl. 240—7.1)

My invention relates to auxiliary headlights and more particularly to auxiliary headlights that are arranged to direct their rays of light against the front and forward portions of an automobile. Certain objects of the invention are to provide auxiliary headlights that are adjustably adapted to project light rays upon any desired portion of the forward end of an automobile. Further objects are to provide four different means of adjustment whereby the headlights may be respectively moved closer together by swinging them in a horizontal plane, whereby they may be moved in a vertical plane, whereby they may be moved on their vertical axes, and whereby they may be extended from their point of connection with the automobile. A still further object is to provide means whereby the lights are readily detached from the automobile.

With the above and other objects in view which will appear as the description proceeds, the invention consists of the novel construction, adaptation, combination and arrangement of parts hereinafter described and claimed. These objects are accomplished by devices illustrated in the accompanying drawing; wherein:

Figure 1 is a view in perspective showing the auxiliary headlights mounted on the main headlights of an automobile; Fig. 2 is a view in front elevation of the same; Fig. 3 is an enlarged view in side elevation showing an auxiliary headlight connected to a main headlight; and Fig. 4 is an enlarged view in central vertical section of an auxiliary headlight and its associated connections.

Referring in detail to the drawing, throughout which like reference numerals indicate like parts, the numeral 5 designates the forward end portion of an automobile having the usual main headlights 6 mounted thereon in any customary or desired manner. It being understood that two auxiliary headlights are always used, only one will be set forth in detail as they are both identical in construction.

As a means for mounting an auxiliary headlight in connection with a main headlight, I first provide a boss 7 on the forward top central part of the main headlight. The top of this boss may be toothed or serrated and is provided with a vertical hole which receives a bolt 8. The bolt serves as a fastening means for a bracket bearing 9, the flat bearing portion of which is likewise toothed or serrated on its bottom where it rests on the boss. Said bracket bearing has a horizontal threaded stud 10 onto which is threaded a hollow horizontal arm 11. It will be apparent that said horizontal arm may be adjustably moved to different positions in the horizontal plane by manipulating the bolt 8. This constitutes the first adjustment of the device.

The hollow horizontal arm 11 telescopically receives another horizontal extension arm 12 which may be moved horizontally therein and held in any desired position by a set screw 13 connected to the hollow arm and engaging the extension arm. This arrangement forms the second adjustment of the device. The extension arm 12 is also hollow and its outer end is internally threaded to receive a threaded stud 14 which is an integral part of a ring bearing 15. This ring bearing receives a hollow upstanding socket bearing 16, which is provided with an annular shoulder resting on the ring bearing, and whose lower end below the ring is threaded to receive a ring nut 17 whereby the socket bearing is retained within the ring as will be understood. This arrangement also provides means whereby the socket bearing may be revolved on its axis within the ring bearing, and a set screw 18 extends through the ring and engages the socket so that the socket may be secured at any desired axial position, thus providing a third adjustment for the device.

An upstanding tubular arm 19 fits into the upper portion of the socket bearing 16 and may be retained therein by an L-shaped slot and stud as shown in dotted lines at 20 in Fig. 4 of the drawing. The top of the upstanding arm may be flattened on its sides and fitted between the arms of a U-shaped bracket 21 that is secured to the bottom of the auxiliary headlight housing 22. A bolt and wingnut 23 may serve as a pivotal securing means for the top of the tubular arm and the bracket whereby the auxiliary headlight may be adjustably moved to different positions within a vertical plane as will be understood. This feature provides the fourth adjustment of the device.

The housing 22 is equipped with the usual reflector member 24 and lens 25, and an electric light 26 is mounted within the reflector. Conduit wires 27, that are connected to said light, may extend through the foregoing described hollow members in any desired manner and back to a connection with the wires of the main headlight 6. A cup-like shield or hood 28 is connected to the housing 22 and is provided with an opening 29 in its lower portion, which opening is about one fourth the area of the entire shield. The shield, of course, obscures the rays of light from a driver's eyes.

From the foregoing description, it will be apparent that the auxiliary headlight is detachable and may be removed by turning the upstanding tubular arm 19 so that the stud and L-shaped slot 20 may be disengaged from each other when said tubular arm is lifted upwardly. The disengaged headlight may then be installed in suitable sockets provided on any other portion of the automobile. It will be noted that the current wire 27 is disconnected at a contact point designated by the numeral 30 in Fig. 4.

By means of the horizontal adjustment shown at 8, the entire device may be swung in a horizontal direction and by means of the adjustment shown at 13 the horizontal arms may be lengthened. These features are particularly desirable for the reason that the two main headlights on different automobiles may vary in their distances apart, and by means of these adjustments the two auxiliary headlights may be moved closer together or further apart as desired. Furthermore, the auxiliary lights may be swung around to the side and lengthened out whereby they would be very useful in illuminating the sides of the automobile when changing a tire, making repairs and the like. While I have described the devices as connected to the main headlights, it will be understood that they may be connected to any fixed front portion of the automobile. The horizontal adjustment at 18 and the pivotal or vertical adjustment at 23 may be used for directing the light higher or lower and for laterally shifting the light to illuminate any forward and side portion of the automobile as desired.

It will now be apparent that I have provided an effective adjustable means for illuminating the front and sides of an automobile. Having thus described my invention, it being understood that many minor changes may be made therein without departing from the scope of the invention, what I claim and desire to secure by Letters Patent of the United States is:—

An auxiliary headlight comprising a housing and a light directing shield, an upstanding arm, pivotal and adjustable connecting means between the upstanding arm and housing whereby the housing and shield are adjustably movable in a vertical plane, a socket bearing detachably supporting the upstanding arm, a horizontal extension arm, a ring bearing connecting one end of the extension arm to the socket bearing and adjusting means therefor whereby the housing and shield are adjustably movable in a horizontal plane, a bracket bearing pivotally supporting the other end of the horizontal extension arm, adjusting means for securing the extension arm in its horizontal plane, and adjusting means for varying the length of the horizontal extension arm.

ANTOIN LEVESQUE.